A. N. SMILEY.
Potato-Digger.

No. 205,310.                    Patented June 25, 1878.

Witness  
John R. Mason  
W. K. Knowles, M.D.

Inventor  
Amos N. Smiley  
Per Wm Franklin Seavy Atty

UNITED STATES PATENT OFFICE.

AMOS N. SMILEY, OF BANGOR, MAINE.

IMPROVEMENT IN POTATO-DIGGERS.

Specification forming part of Letters Patent No. 205,310, dated June 25, 1878; application filed February 23, 1878.

*To all whom it may concern:*

Be it known that I, AMOS N. SMILEY, of Bangor, in the county of Penobscot and State of Maine, have invented certain new and useful Improvements in Potato-Diggers; and I do hereby declare that the following is a full, clear, and exact description thereof, that will enable others skilled in the art to which it appertains to make and use the same, reference being had to the accompanying drawings, forming a part of this specification, in which—

Figure 2:
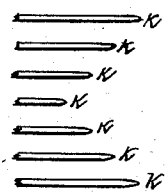
Figure 1:
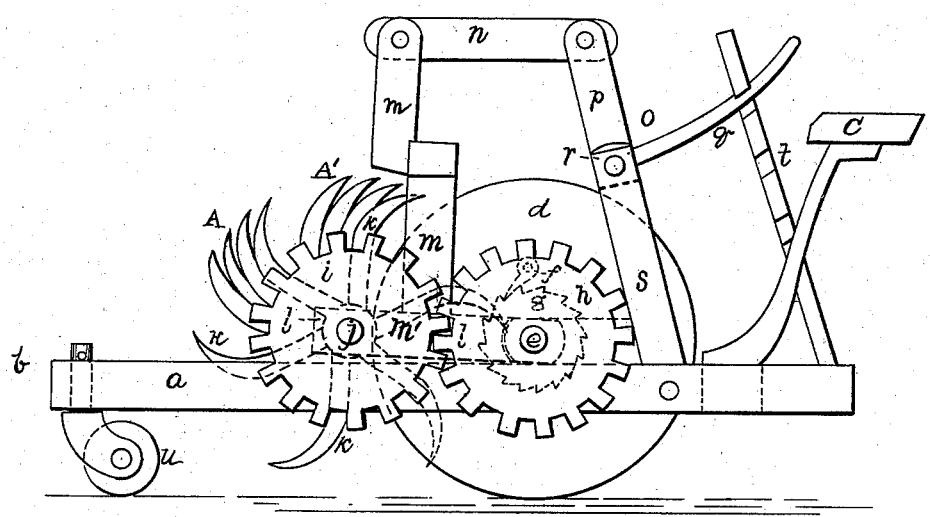

Figure 1 shows a side view of my potato-digger; Fig. 2, detail, showing arrangement of the fingers.

Same letters show like parts.

My invention consists of an improved potato-digger, the construction and operation of which can be best explained by reference to the accompanying drawings.

At $a$ is shown a suitable frame, to which may be attached, at $b$, a tongue or shafts, and upon which is placed the driver's seat $c$. This frame is mounted upon wheels $d\ d$ running loosely upon the axle $e$, and provided with pawls $f\ f$, engaging, when the machine moves forward, with ratchets $g\ g$ fast on said axle, so that the axle is revolved by the wheels as the machine is moved forward.

At the extremity of the axle $e$ is a gear, $h$, by which revolution is communicated to a second gear, $i$, and its shaft $j$, upon which are the fingers or diggers $k$. For the purpose of regulating the depth of cut of these fingers, the shaft $j$ is mounted in a supplemental frame, $l$, pivoted at one end upon the axle $e$ of the wheels $d\ d$, so that its free end may be raised or lowered without disarranging the gears $h\ i$.

Attached to this pivoted frame is a system of levers, by which its position can be adjusted from the driver's seat. This consists of a standard, $m$, secured to the frame, and forming with it a bell-crank, $m'$, united by a link, $n$, to a second bell-crank, $o$, formed by an upright, $p$, and lever $q$, secured to a rock-shaft, $r$, supported by standards $s$ rigidly secured to the frame $a$. By depressing the lever $q$ the pivoted frame $l$ and its diggers $k$ are raised, and vice versa, being secured in either position by a notched standard, $t$. The forward end of the frame may be supported by trucks $u\ u$, or, if preferred, hung from the axle and wheels of an ordinary cart.

The fingers being adjusted at the proper height, the machine is driven forward over the row of potato-hills. The diggers are revolved as described, entering the ground and passing under and raising the vegetables. As the potatoes are lifted and pass over the shaft $j$ the soil is sifted out, dropping between the fingers $k$, while the potatoes are deposited upon the surface of the ground between the wheels of the machine, and out of their track. This result I effect by the arrangement of the fingers upon the shaft, setting them back as they approach the center. This is shown at A A', in Fig. 1, and also in the detail, Fig. 2, which shows a plan of the fingers A' of Fig. 1. This arrangement causes the potatoes as they are gathered to roll toward the center from each side, and facilitates the sifting of the dirt and the subsequent labor of gathering.

By reversing the fingers upon the shaft, and facing the seat toward what is represented in the drawing as the rear of the machine, the digger may be used with the operative mechanism behind instead of in front of the driver. This arrangement does not alter the principle of the machine, but may be preferred in some cases as a matter of convenience.

In the drawing, Fig. 1, a portion only of the diggers $k$ are shown, for the sake of clearness.

I do not claim rotary diggers arranged spirally upon the shaft. This arrangement would throw the potatoes out at one side of the machine, and this result is just what I desire to avoid. My diggers are arranged with the center teeth or fingers setting back of the next, and so on, the line of fingers on the shaft being V-shaped, and thus forming a scoop and dropping the potatoes under the middle of the machine instead of at one side.

What I claim as my invention, and desire to secure by Letters Patent, is—

The arrangement of the fingers or diggers $k$ upon the shaft $j$, each finger, from the ends toward the center of said shaft, being set back of the next outer finger, so as to form together a V-shaped scoop, as and for the purposes set forth.

In testimony that I claim the foregoing I have hereunto set my hand this 18th day of February, 1878.

AMOS N. SMILEY.

Witnesses:
 WM. FRANKLIN SEAVEY,
 JOHN R. MASON.